(No Model.)
H. L. WHITMAN.
BALING PRESS.
No. 363,708. Patented May 24, 1887.
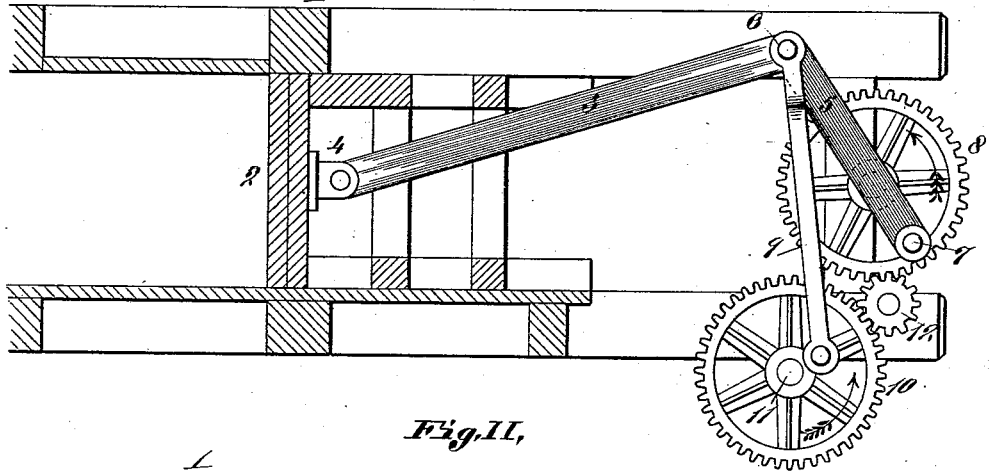
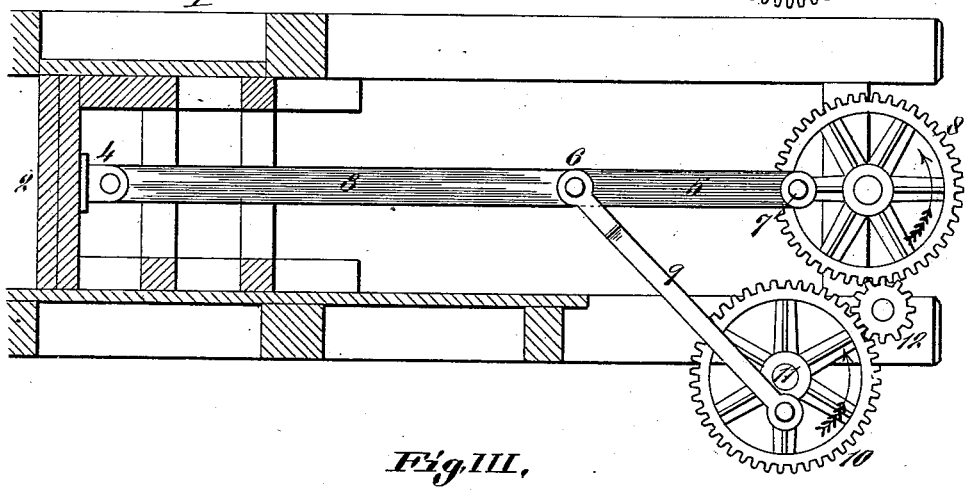
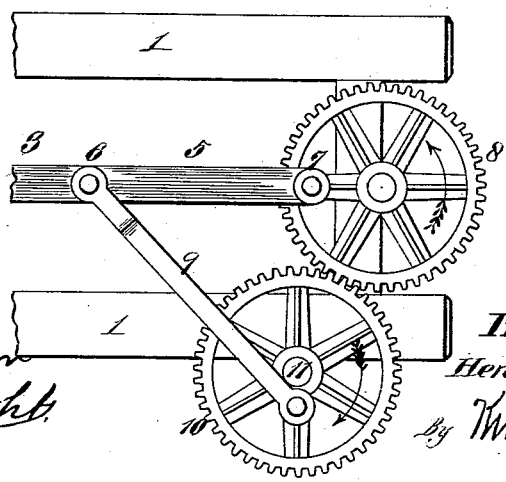
Attest:
Emma Arthur
Hervey Knight
Inventor,
Henry L. Whitman
by Knight Bros
Atty's

UNITED STATES PATENT OFFICE.

HENRY L. WHITMAN, OF ST. LOUIS, MISSOURI.

BALING-PRESS.

SPECIFICATION forming part of Letters Patent No. 363,708, dated May 24, 1887.

Application filed January 3, 1887. Serial No. 223,250. (No model.)

*To all whom it may concern:*

Be it known that I, HENRY L. WHITMAN, of the city of St. Louis, in the State of Missouri, have invented certain new and useful improvements in Baling-Presses, of which the following is a full, clear, and exact description, reference being had to the accompanying drawings, forming part of this specification, and in which—

Figure I is a horizontal longitudinal section through part of a baling-press embodying my invention. Fig. II is a similar view showing the traverser in its forward position, it being shown at or about its rear position in Fig. I. Fig. III is a detail view illustrating a slight modification.

My invention relates to an improvement in powers for baling-presses, and which is similar in its character (though somewhat different in construction) to that shown and described in the application of Charles E. Whitman, filed on or about the 30th day of December, 1886.

My invention consists in features of novelty, hereinafter fully described, and pointed out in the claims.

Referring to the drawings, 1 represents the body of the press, and 2 the traverser. 3 represents the pitman, connected to the traverser at 4. 5 represents a link connected to the outer end of the pitman, at 6, by one end, and connected by the other end, at 7, to a cog-wheel, 8, or to other means—such, for instance, as that shown by the way of modifications in the application of Charles E. Whitman referred to— for imparting power to the traverser. 9 represents an arm connected to the pitman 3 and link 5, preferably at their juncture, as shown. These parts are all similar in their construction and operation to that shown in the application mentioned. Instead, however, of connecting the outer end of the arm 9 to a fixed object, as shown in the application referred to, I connect it to a movable object—as, for instance, a cog-wheel, 10, secured to a shaft or support, 11, the arm being connected to the wheel to one side of its center. The wheel 10 is turned, preferably, by being connected to the wheel 8, and I prefer to connect them through means of an intermediate pinion, 12; but they may be connected directly, as shown in Fig. III. As the wheel 8 is turned the wheel 10 is also turned in the direction indicated by the arrows, and through means of the arm 9 causing the pitman and link 3 5 to be thrown into the position shown in Fig. I, and as the wheels continue to turn the pitman and link are brought down into line, as shown in Fig. II.

The arm 9 (as explained in the application of Charles E. Whitman, mentioned) accelerates the movement of the traverser, and this movement is further increased by means of the outer end of the arm being connected to a movable support, as shown in my application, the point of connection between the arm and the wheel 10 moving toward the pitman and link as the traverser recedes. Thus the additional amount of throw of the traverser obtained by my construction over that obtained by the construction shown and described in the application of Charles E. Whitman referred to is equal to the distance between the center of the wheel 10 and the point of connection between the arm 9 and the wheel, thus adding considerably to the throw of the traverser, and also adding to the speed with which the traverser moves on its backward stroke.

I do not claim, broadly, the combination of a traverser, means for imparting movement to said traverser, a jointed connection between said means and traverser, and a device for throwing said jointed connection out of line, as the same is claimed, broadly, in the application, Serial No. 223,024, of Charles E. Whitman, filed on or about the 30th day of December, 1886; but I do claim such a combination when the device for throwing the pivoted connection out of line is secured to a movable bearing.

I claim as my invention—

1. In a baling-press, the combination of the traverser, pitman connected to the traverser, link connected to the pitman, wheel to which the link is connected, arm connected to the pitman and link, and a movable bearing to which the outer end of the arm is connected, substantially as and for the purpose set forth.

2. In a baling-press, the combination of the traverser, pitman connected to the traverser, link connected to the pitman, wheel to which the link is connected, arm connected to the pitman and link, wheel 10, to which the outer end of the arm is connected, and means for turning the wheel, substantially as and for the purpose set forth.

3. In a baling-press, the combination of the traverser, pitman connected to the traverser, link connected to the pitman, wheel to which the link is connected, arm pivoted to the pitman and link at their juncture, and cog-wheel to which the link is connected at one side of its center, said wheel being geared to turn with the power-wheel, to which the link is connected, substantially as and for the purpose set forth.

4. In a baling-press, in combination with a traverser and means for imparting movement, a jointed connection between the traverser, and means for imparting the movement and means for accelerating the movement of the traverser by throwing the jointed connection out of line, said means being connected to a movable bearing or support, substantially as and for the purpose set forth.

HENRY L. WHITMAN.

In presence of—
 GEO. H. KNIGHT,
 EDW. S. KNIGHT.

Correction in Letters Patent No. 363,708.

It is hereby certified that in Letters Patent No. 363,708, granted May 24, 1887, upon the application of Henry L. Whitman, of St. Louis, Missouri, for an improvement in "Baling Presses," an error appears in the printed specification requiring the following correction, viz: On page 2, in line 13, a comma should be inserted after the word "movement;" and that the said Letters Patent should be read with this correction therein that the same may conform to the record of the case in the Patent Office.

Signed, countersigned, and sealed this 7th day of June, A. D. 1887.

[SEAL.]

D. L. HAWKINS,
*Acting Secretary of the Interior.*

Countersigned:
BENTON J. HALL,
*Commissioner of Patents.*